United States Patent
Buffkin et al.

(10) Patent No.: US 11,946,454 B2
(45) Date of Patent: Apr. 2, 2024

(54) MOUNTING TOOL FOR FASTENER ASSEMBLY AND DISASSEMBLY WITHIN WIND TURBINE HUBS

(71) Applicant: General Electric Company, Schenectady, NY (US)

(72) Inventors: Ward Anthony Buffkin, Summerville, SC (US); Michael Royce Johnson, Campton, NH (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/534,487

(22) Filed: Nov. 24, 2021

(65) Prior Publication Data

US 2023/0160370 A1 May 25, 2023

(51) Int. Cl.
*F03D 80/50* (2016.01)
*F03D 80/70* (2016.01)

(52) U.S. Cl.
CPC .............. *F03D 80/50* (2016.05); *F03D 80/70* (2016.05); *F05B 2230/80* (2013.01); *F05B 2240/916* (2013.01); *F05B 2260/301* (2013.01)

(58) Field of Classification Search
CPC ............ F05B 2260/301; F05B 2230/80; F05B 2240/916; F03D 80/50; F03D 80/70
See application file for complete search history.

(56) References Cited

U.S. PATENT DOCUMENTS

| 2009/0220343 | A1  | 9/2009  | Dimascio et al. |
|---|---|---|---|
| 2013/0180349 | A1  | 7/2013  | Skaff et al. |
| 2014/0314576 | A1* | 10/2014 | Lieberknecht .......... F03D 13/10 29/889.7 |
| 2015/0086367 | A1  | 3/2015  | Holloway et al. |
| 2020/0362827 | A1* | 11/2020 | Sahni ...................... F03D 80/50 |
| 2022/0203486 | A1* | 6/2022  | Nielsen ................... B25B 29/02 |

FOREIGN PATENT DOCUMENTS

| EP | 3382200 A1 | 10/2018 |
|---|---|---|
| JP | 2015151989 A | 8/2015 |

OTHER PUBLICATIONS

EP Search Report for EP application No. 22205858.8, dated Apr. 26, 2023, 8 pages.

* cited by examiner

*Primary Examiner* — Moshe Wilensky
(74) *Attorney, Agent, or Firm* — Dority & Manning, P.A.

(57) ABSTRACT

A mounting tool includes a base component and an attachment means. The base component includes a mounting portion defining an attachment location for receiving and securing a repair tool so as to maintain the repair tool at a desired repair location and a first receiving portion defining a first cavity for receiving a portion of a wind turbine so as to be externally secured to the wind turbine. The attachment means may be adjustably secured to the first receiving portion of the base component and securable to the portion of the wind turbine so as to secure the mounting tool to the wind turbine at the desirable repair location.

18 Claims, 13 Drawing Sheets

MOUNTING TOOL FOR FASTENER ASSEMBLY AND DISASSEMBLY WITHIN WIND TURBINE HUBS

FIELD

The present disclosure relates generally to wind turbines, and more particularly, to mounting tools for use with various repair tools that provide a mounting location for an operator to mount or otherwise secure a repair tool thereto up-tower of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotatable hub having one or more rotor blades mounted thereto. The rotor blades are typically mounted to the hub via respective pitch bearings that allow rotation of each of the rotor blades about a pitch axis. Thus, the rotor blades capture kinetic energy of wind using known airfoil principles. For example, the rotor blades typically have the cross-sectional profile of an airfoil such that, during operation, air flows over the rotor blades producing a pressure difference between the sides. Consequently, a lift force, which is directed from a pressure side towards a suction side, acts on the each of the rotor blades. The lift force generates torque on the main rotor shaft, which is typically geared to a generator for producing electricity.

As the popularity of wind turbines continues to grow, the size of such wind turbines has also increased so as to generate more power. However, with the increasing size the wind turbines, individual components of such wind turbines also increase. Thus, the complexity of transporting, installing, assembling/disassembling, and repairing/replacing such components has also increased. In addition, during operation of larger wind turbines, loads on the individual components are also increased.

For example, large wind turbine hubs having a large diameter include high torque fasteners that are used to secure the pitch bearings between the rotor blades and the hub. In particular, a plurality of blade bolts is typically used to secure each of the rotor blades to the pitch bearing, whereas a plurality of hub bolts is typically used to secure the pitch bearing to the hub. A similar arrangement is also provided for the yaw bearing, which is secured between the tower and the nacelle.

When such bearings need to be serviced and/or replaced, however, an operator typically has to remove each of the fasteners manually up-tower, which can be a tedious and sometimes dangerous process if proper care is not taken. Thus, the operator typically uses a torque tool for removing and/or installing the fasteners to assist with the operation. Due to the number of fasteners in the bearing and the weight of the tool, however, the operator may experience fatigue and/or injury.

Thus, the industry is continuously seeking new and improved systems and methods for assisting an operator up-tower in various repair processes. Accordingly, the present disclosure is directed to a mounting tool for use with various repair tools up-tower that provides a mounting location for an operator to mount or otherwise secure a repair tool thereto such that certain repair processes are easier to complete.

BRIEF DESCRIPTION

Aspects and advantages of the disclosure will be set forth in part in the following description, or may be obvious from the description, or may be learned through practice of the disclosure.

In one aspect, the present disclosure is directed to a mounting tool for use with various repair tools in a wind turbine. The mounting tool includes a base component encompassing a mounting portion and a first receiving portion. The mounting portion includes a mounting surface defining an attachment location for receiving and securing a repair tool thereto so as to maintain the repair tool at a desired repair location of the wind turbine. In addition, the first receiving portion defines a first cavity for receiving a portion of the wind turbine so as to be externally secured to the wind turbine. The mounting tool also includes attachment means adjustably secured to the first receiving portion of the base component and securable to the portion of the wind turbine so as to secure the mounting tool to the wind turbine at the desired repair location.

In an embodiment, the mounting portion of the mounting tool may be a detachable arm member rotatably affixed to the first receiving portion of the base component. Additionally, the mounting surface and the attachment location are located on the detachable arm member.

In another embodiment, the desired repair location may be a location adjacent to a bearing of the wind turbine. Further, the bearing may include at least one of a pitch bearing or a yaw bearing. Moreover, the repair tool of the mounting tool may be a torque tool for assembling or disassembling fasteners to or from at least one of the pitch bearing or the yaw bearing.

In still another embodiment, the first cavity of the first receiving portion includes a tapered inner surface for accommodating varying thicknesses of the portion of the wind turbine.

In particular embodiments, the attachment means of the mounting tool may include at least one of one or more straps, one or more ropes, or one or more bands.

In other embodiments, the attachment means includes at least two straps that wrap around the portion of the wind turbine.

In additional embodiments, the portion of the wind turbine may be a web of a hub of the wind turbine. Further, at least two straps may wrap around the web of the hub of the wind turbine through one or more openings in the hub.

In yet other embodiments, the mounting tool may further include at least one winching mechanism for adjusting the attachment means.

In further embodiments, the mounting tool may further include a support component encompassing a second receiving portion defining a second cavity for receiving another portion of the wind turbine.

In further still embodiments, the second cavity of the second receiving portion of the mounting tool includes a tapered inner surface for accommodating varying thicknesses of the portion of the wind turbine.

In still other embodiments, the base component and support component each includes one or more corresponding recessed pathways for receiving and securing the attachment means therein.

In other particular embodiments, the mounting tool includes at least one of the one or more corresponding recessed pathways guides the attachment means at a desired angle away from the portion of the wind turbine.

In another aspect, the present disclosure is directed to a repair assembly for a wind turbine. The repair assembly includes a repair tool, a mounting tool encompassing a base component, and attachment means for securing the base component to a portion of the wind turbine. In addition, the mounting tool includes a mounting portion and a first receiving portion with the mounting portion including a mounting surface defining an attachment location for receiving and securing the repair tool thereto so as to maintain the repair tool at a desired repair location of the wind turbine. Further, the first receiving portion defines a first cavity for receiving a portion of the wind turbine so as to be externally secured to the wind turbine. Moreover, the attachment means is adjustably secured to the first receiving portion of the base component and securable to the portion of the wind turbine so as to secure the mounting tool to the wind turbine at the desired repair location. Additionally, the repair assembly further includes a platform assembly for mounting adjacent to the mounting tool at the desired repair location.

In yet another aspect, the present disclosure is directed to a method of using a mounting tool. The method includes placing a base component on a portion of a wind turbine. Moreover, the base component includes a mounting portion and a first receiving portion. The mounting portion further includes a mounting surface defining an attachment location for receiving and securing a repair tool thereto so as to maintain the repair tool at a desired repair location of the wind turbine. In addition, the first receiving portion defines a first cavity for receiving a portion of the wind turbine so as to be externally secured to the wind turbine. Further, the method further includes adjustably securing the base component to the portion of the wind turbine via an attachment means so as to secure the mounting tool to the wind turbine at the desired repair location. The method also includes attaching a detachable arm member rotatably affixed to the first receiving portion of the base component. Still further, the method includes attaching a tool holder to a second end of the detachable arm member. Additionally, the method includes placing a tool within the tool holder.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
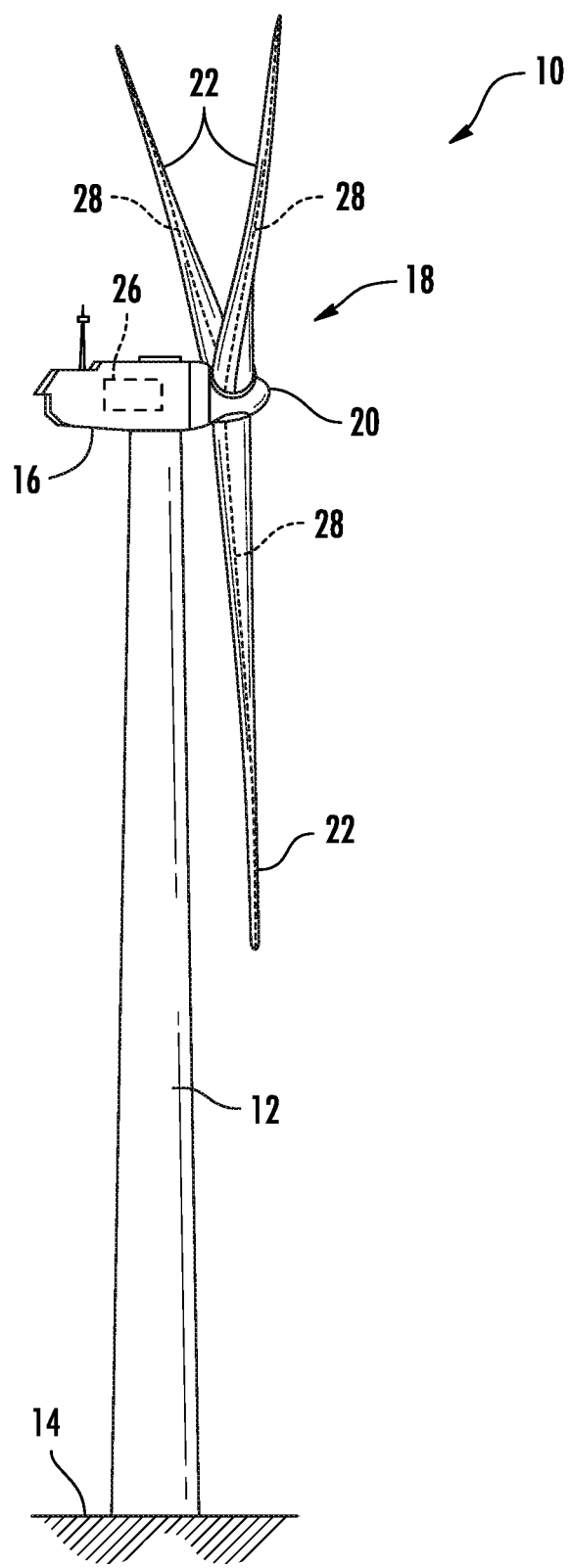
FIG. 1 illustrates a side, perspective view of an embodiment of a wind turbine in which a mounting tool may be used according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

In general, the present disclosure is directed to a mounting tool for use with various repair tools that provide a mounting location for an operator to mount or otherwise secure a repair tool thereto up-tower of a wind turbine, such as within a hub mounted atop a wind turbine tower. In particular, the mounting tool of the present disclosure includes a base component and attachment means for securing the base component to the wind turbine. The base component of the mounting tool may further include a mounting portion and a first receiving portion. The mounting portion may have a mounting surface with an attachment location for receiving and securing a repair tool to the mounting surface. The first receiving portion has a first cavity for receiving a portion of the wind turbine so as to secure the mounting tool to the wind turbine. The attachment means of the mounting tool may be adjustably secured to the first receiving portion and the wind turbine to secure the mounting tool at a desired repair location on the wind turbine. The present disclosure is described herein with reference to a mounting tool in general, and more particularly to a mounting tool for use within a wind turbine but is not limited to use within a wind turbine.

In addition, the present disclosure provides various advantages when addressing the challenges encountered by operators up-tower tasked with repairing wind turbines in general. For example, an advantage of the present disclosure is to allow for operator ease in removing fasteners up-tower by reducing the weight the operator must lift when removing such fasteners. Another advantage is to improve the safety of operators when removing fasteners up-tower by improving the stability of the torque tool when an operator is removing the fasteners.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
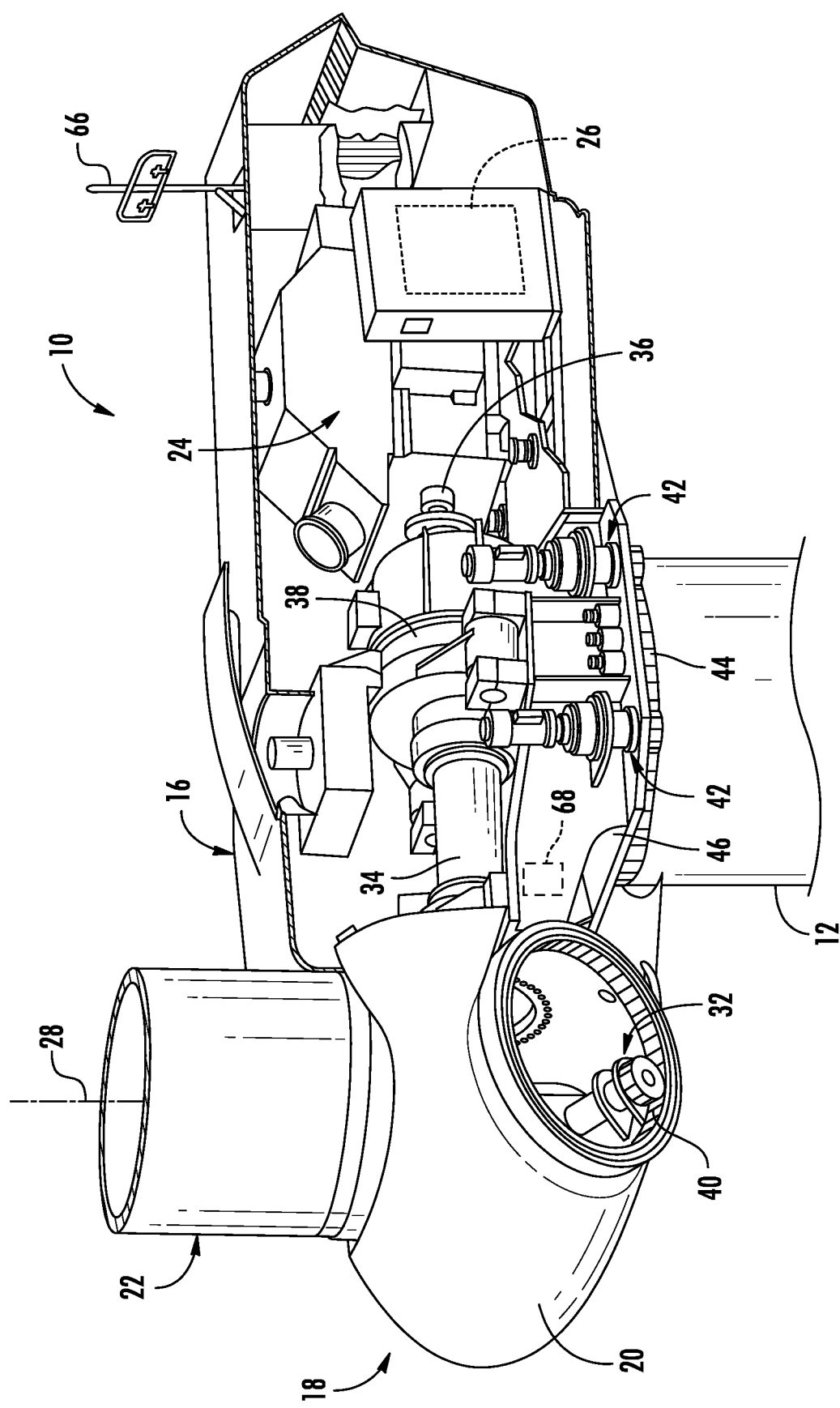
FIG. 2 illustrates an internal, perspective view of an embodiment of the nacelle of the wind turbine of FIG. 1.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also include one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
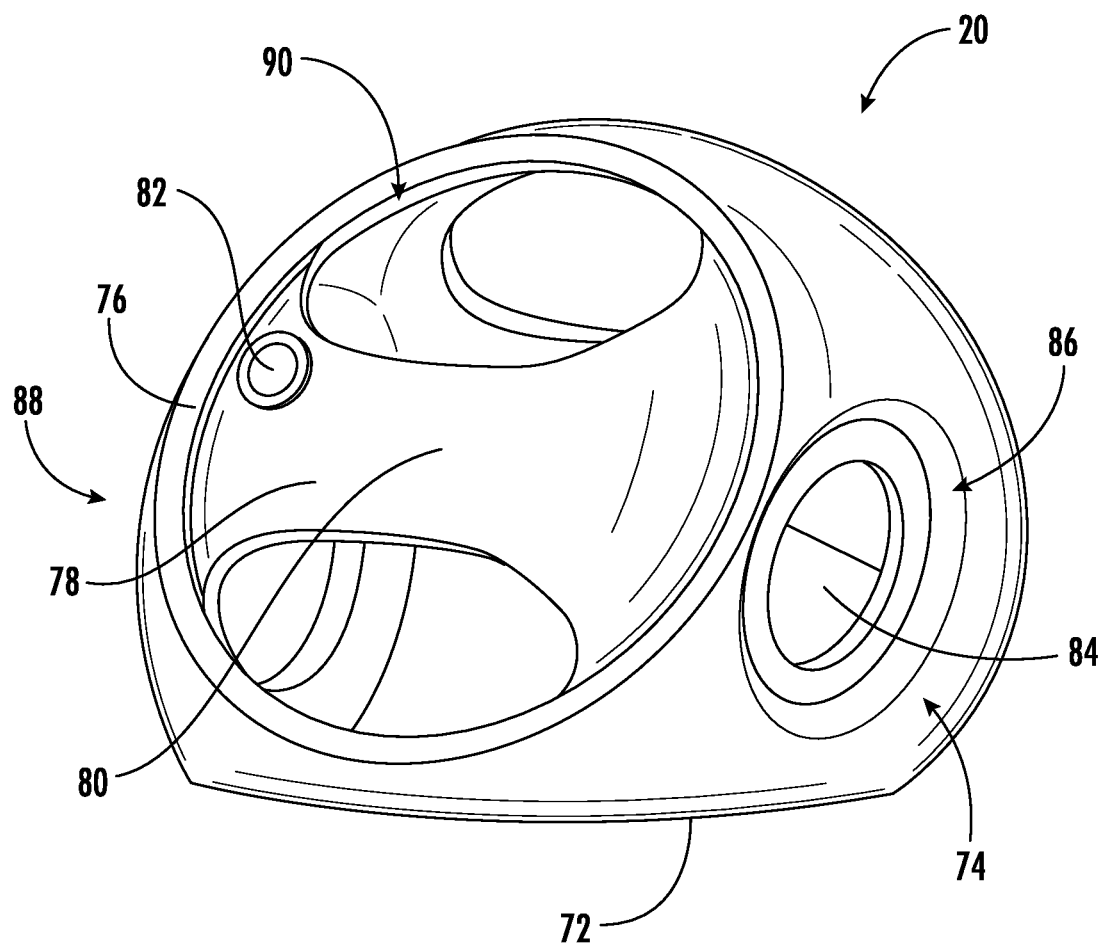
FIG. 3 illustrates a perspective view of an embodiment of a hub of a wind turbine in which a mounting tool may be used according to the present disclosure.

Referring now to FIG. 3, a perspective view of an embodiment of the hub 20 illustrated in FIGS. 1-2 is provided. As shown, the hub 20 has a hollow body 72 that may be constructed of a suitable cast material which is basically known to persons skilled in the art. Other materials providing the required rigidity can also be used. Further, as shown, the hollow body 72 has a first end 88 and a second end 74, wherein the hollow shaft (not shown) of the wind turbine 10 is mounted to the first end 88 of the hollow body 72. Moreover, as shown, the hollow body 72 includes three flanges 76 arranged at the outside thereof for receiving and securing the rotor blades 22 in place. Thus, as shown in the illustrated embodiment, the flanges 76 may be displaced by 120°. In addition, as shown, each flange 76 may include various stiffening webs 78 integrally formed with the wall of the hollow body 72 and extending from the flange 76 radially inwardly to the center 80 of the flange area 90. The hollow body 72 of the hub 20 may also include an optional manhole 84 with a manhole flange 86 such that an operator can access an interior portion of the hollow body 72. Moreover, as shown, the stiffening web 78 may also include an aperture for receiving a pitch drive mechanism 32 therein for rotating the pitch bearing 40.

Figure 4:
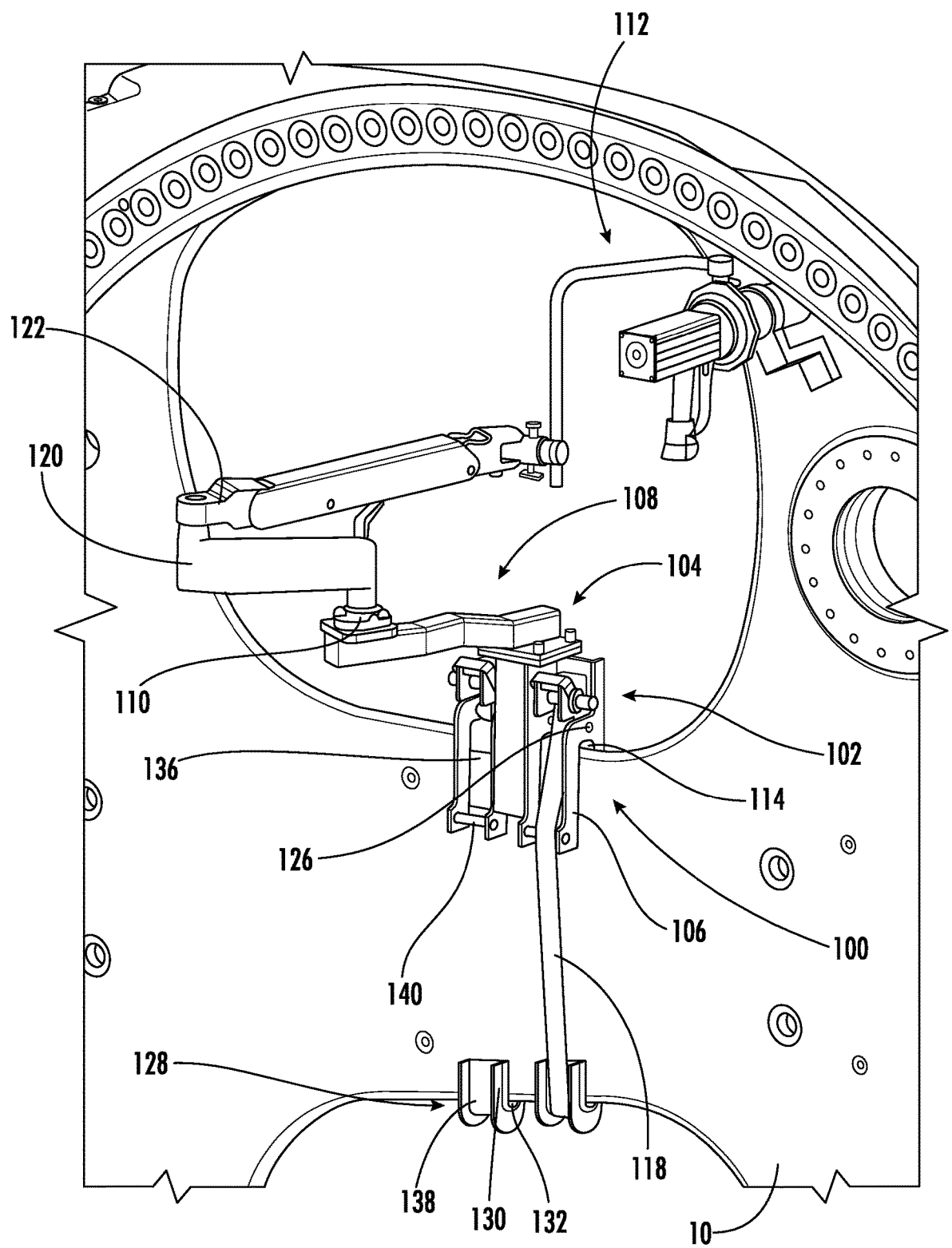
FIG. 4 illustrates a partial, perspective view of an embodiment of a mounting tool installed in a hub of a wind turbine for use with repair tools therein according to the present disclosure.
Figure 5:
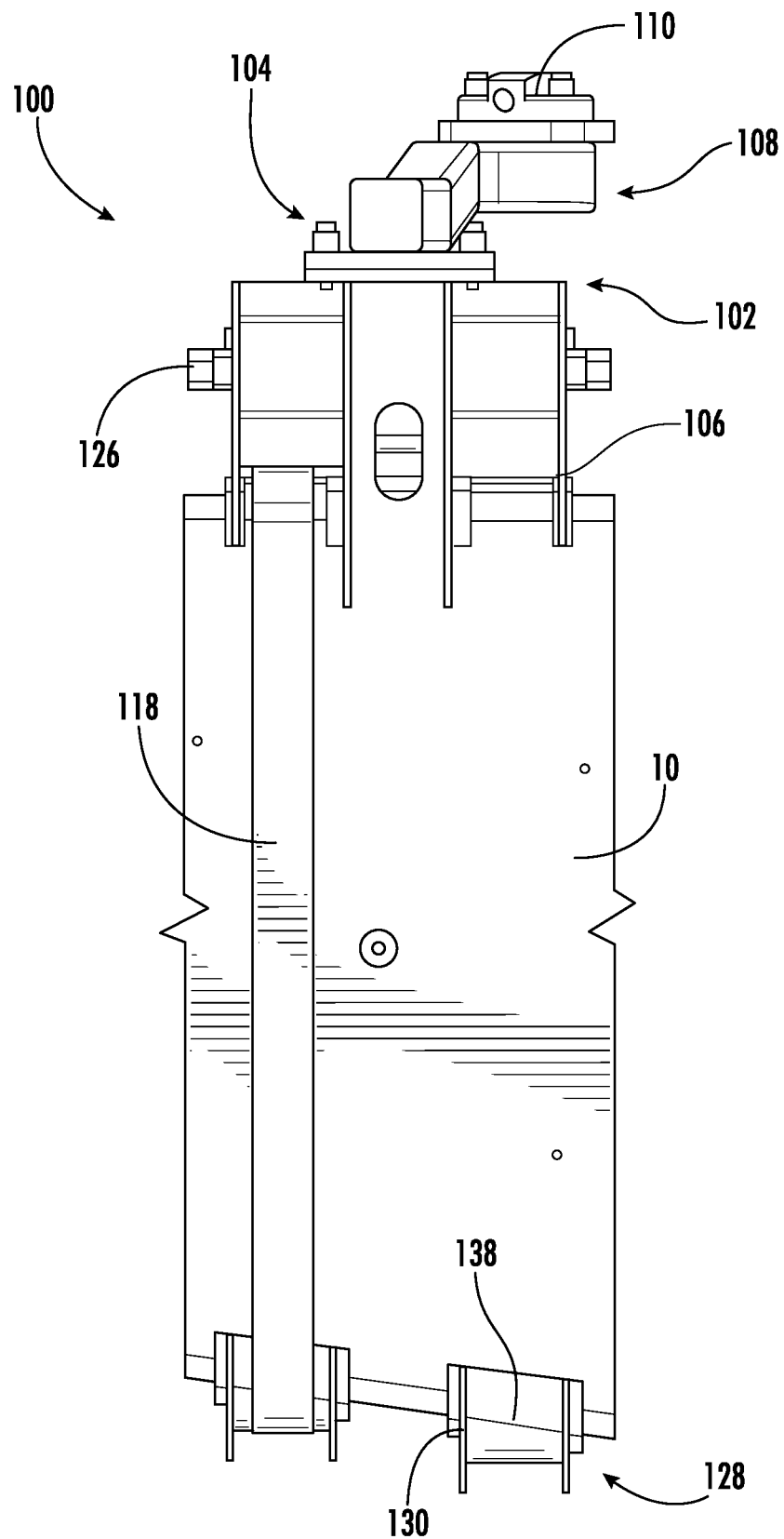
FIG. 5 illustrates a front, perspective view of an embodiment of a mounting tool installed in a hub of a wind turbine for use with repair tools according to the present disclosure.
Figure 6:
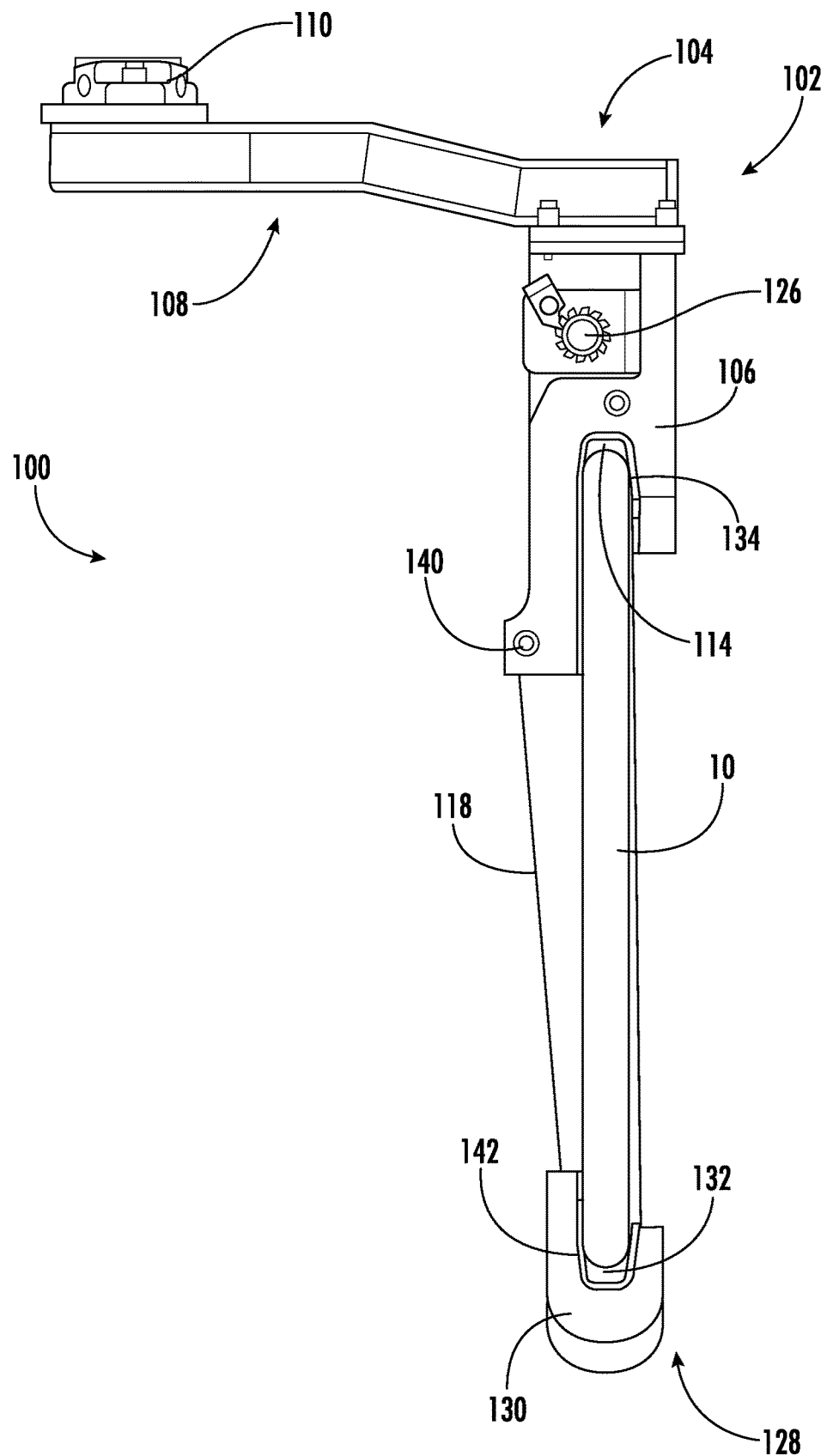
FIG. 6 illustrates a side, perspective view of the mounting tool of FIG. 5.
Figure 7:
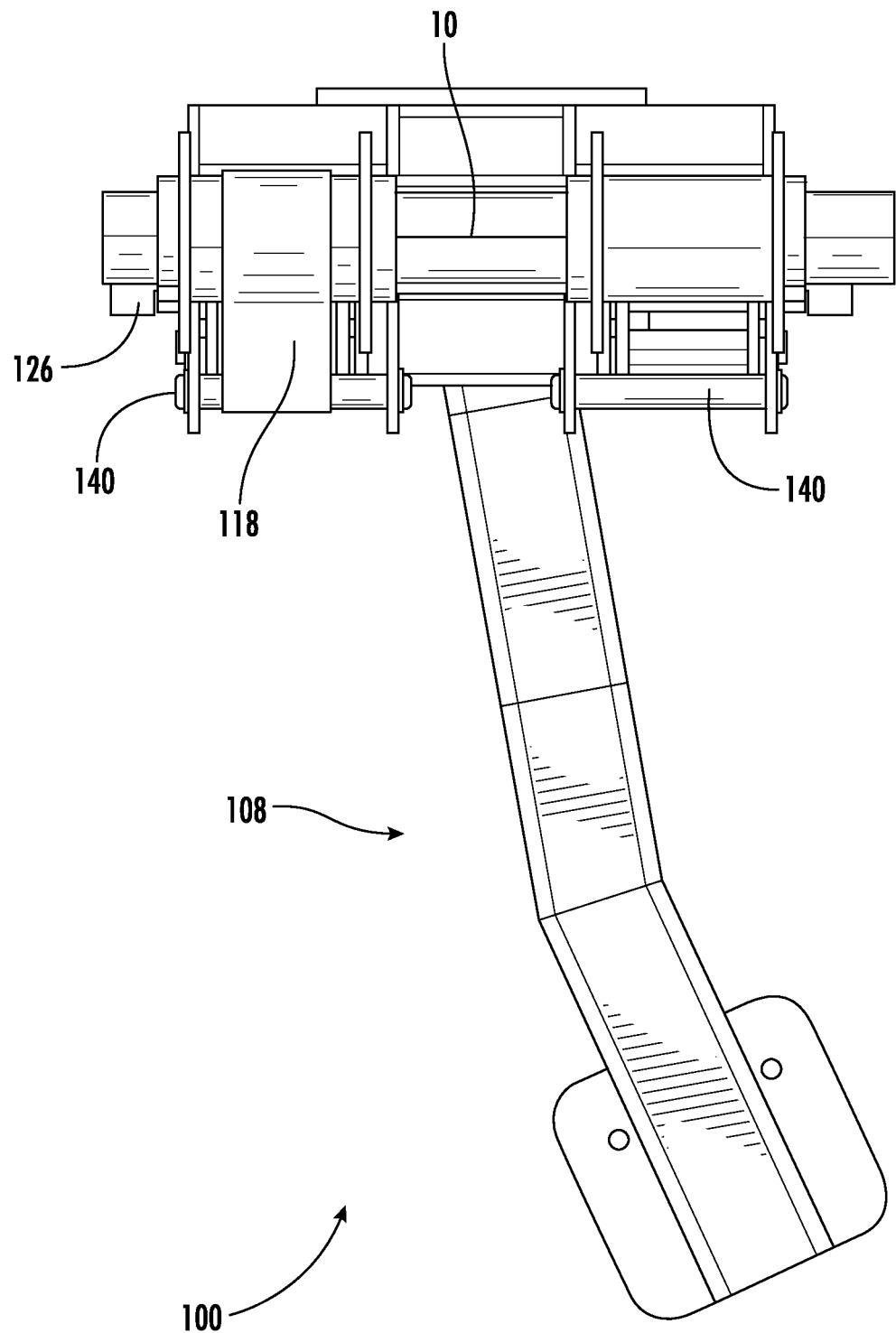
FIG. 7 illustrates a bottom, perspective view of the mounting tool of FIG. 5.
Figure 8:
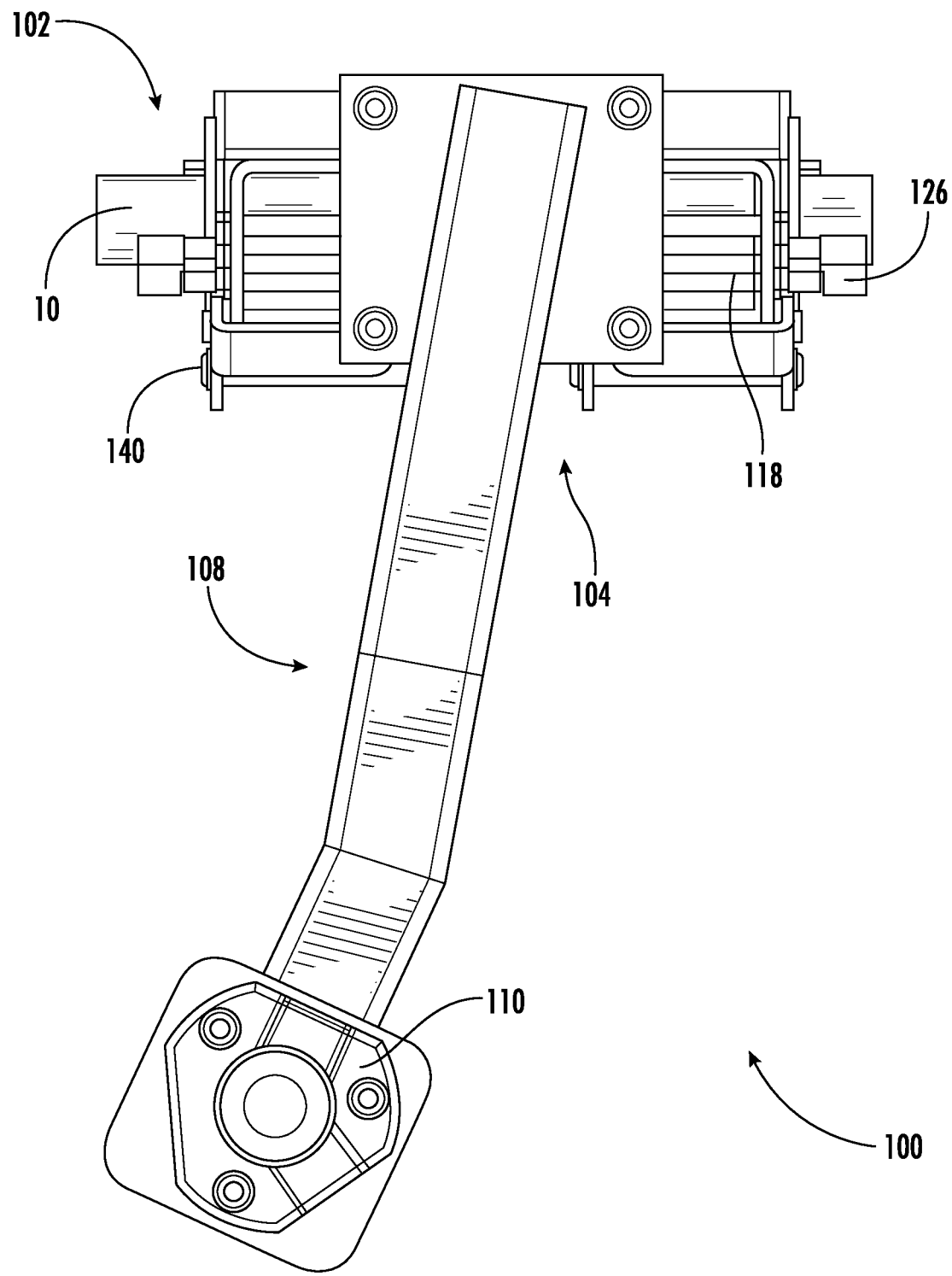
FIG. 8 illustrates a top, perspective view of the mounting tool of FIG. 5.

Referring now to FIGS. 4-11, various views of a mounting tool 100 mounted within the hub 20 of the wind turbine 10 according to the present disclosure are provided. In particular, FIG. 4 illustrates a perspective view of an embodiment of the mounting tool 100 installed in the hub 20 of the wind turbine 10 for use with one or more repair tools 112 according to the present disclosure; FIG. 5 illustrates a back, perspective view of the mounting tool 100 installed within the hub 20; FIG. 6 illustrates a side, perspective view of the mounting tool 100 installed within the hub 20 of FIG. 5; FIG. 7 illustrates a bottom, perspective view of the mounting tool 100 of FIG. 5; FIG. 8 illustrates a top, perspective view of the mounting tool 100 of FIG. 5.

Thus, as shown, FIG. 4 illustrates the mounting tool 100 mounted within the hub 20 when looking from within the hub 20 outside of the hub 20. In addition, as shown, the mounting tool 100 generally includes a base component 102 having a mounting portion 104 and a first receiving portion 106. Moreover, as shown, the mounting portion 104 includes a mounting surface 108 and an attachment location 110 for receiving the repair tool 112. Thus, the attachment location 110 can be customized to hold any suitable repair tool 112.

Figure 9:
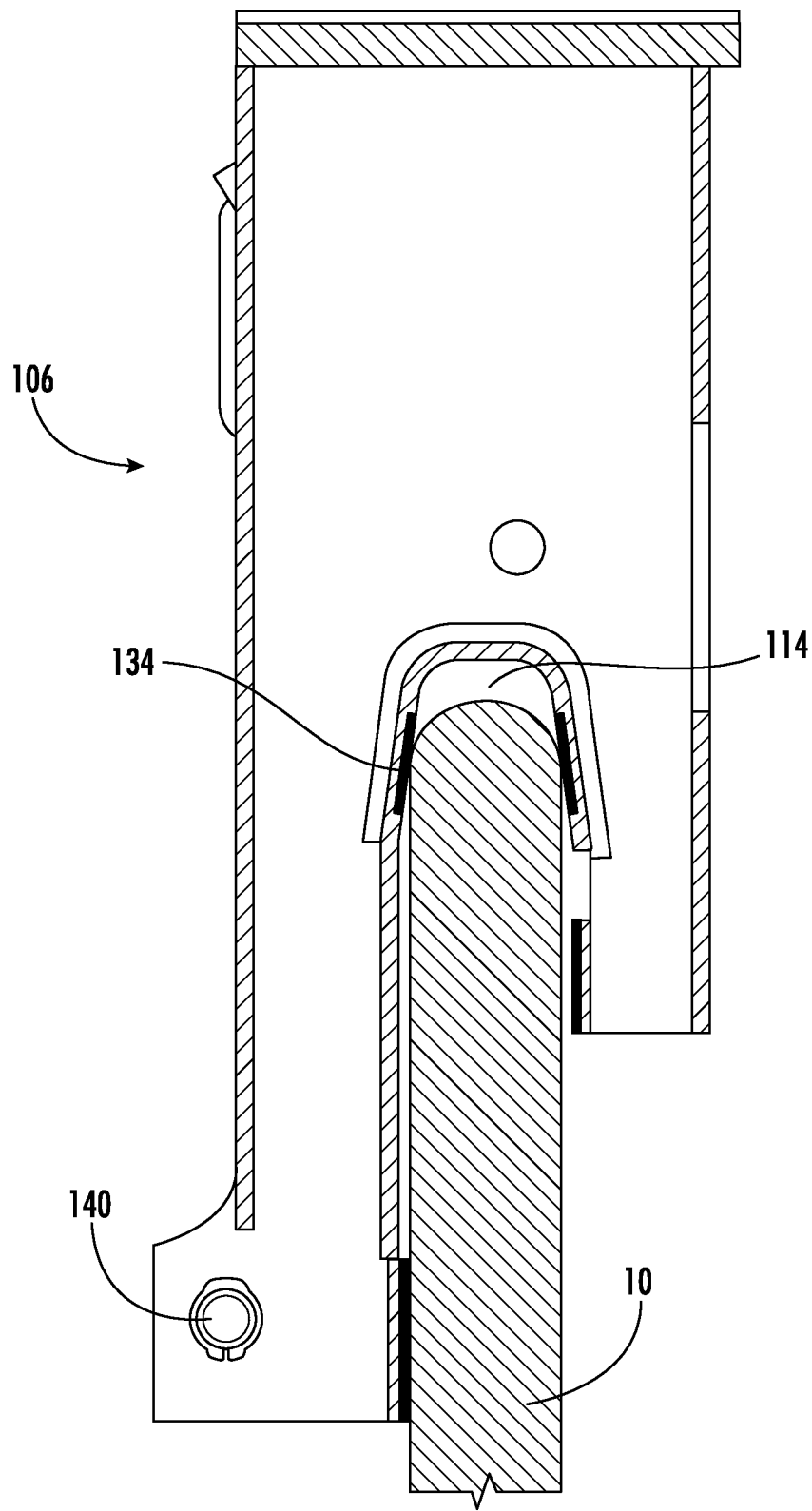
FIG. 9 illustrates a detailed view of an embodiment of a first receiving portion of the mounting tool according to the present disclosure.
Figure 10:
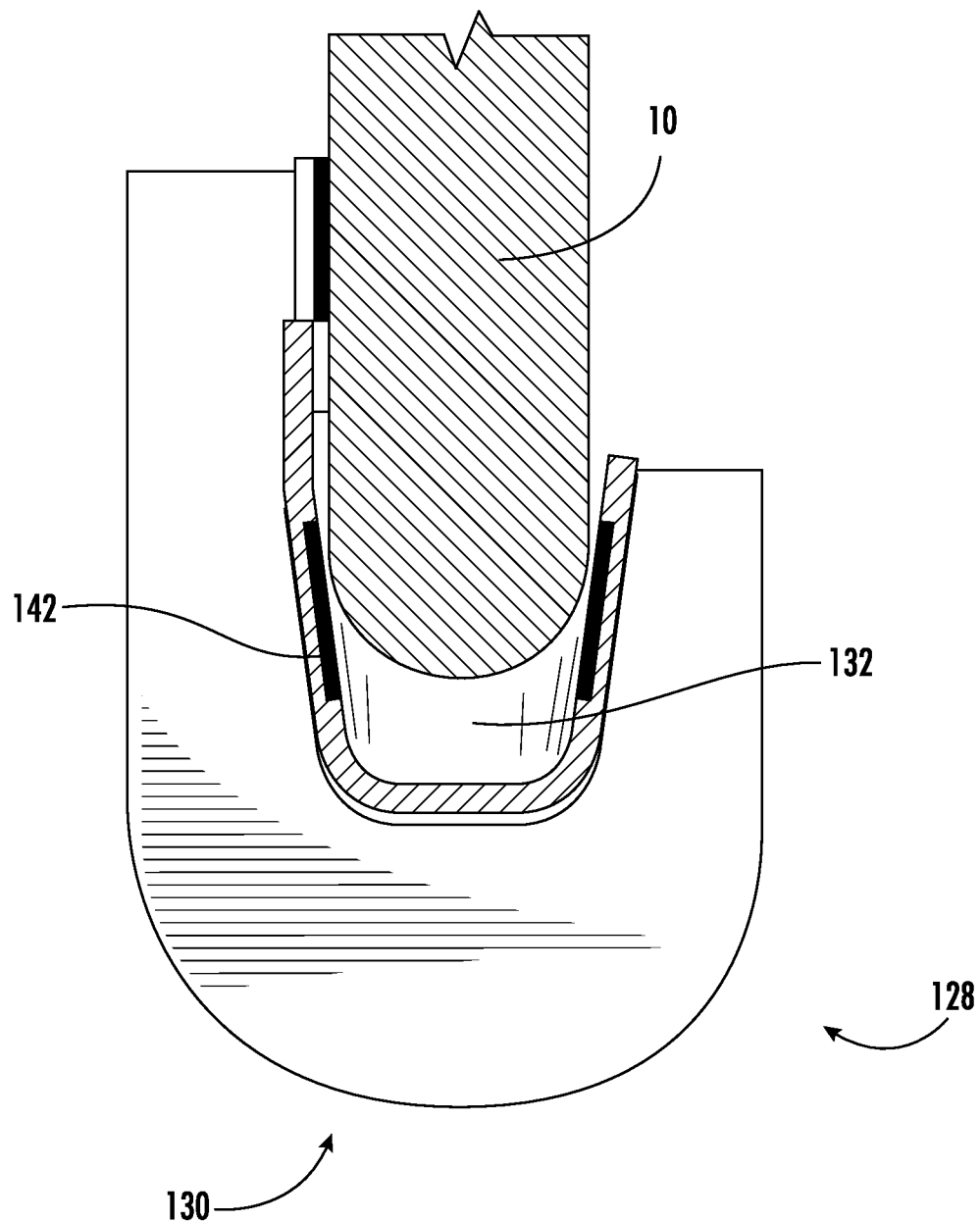
FIG. 10 illustrates a detailed view of an embodiment of a second receiving portion of the mounting tool according to the present disclosure.
Figure 11:
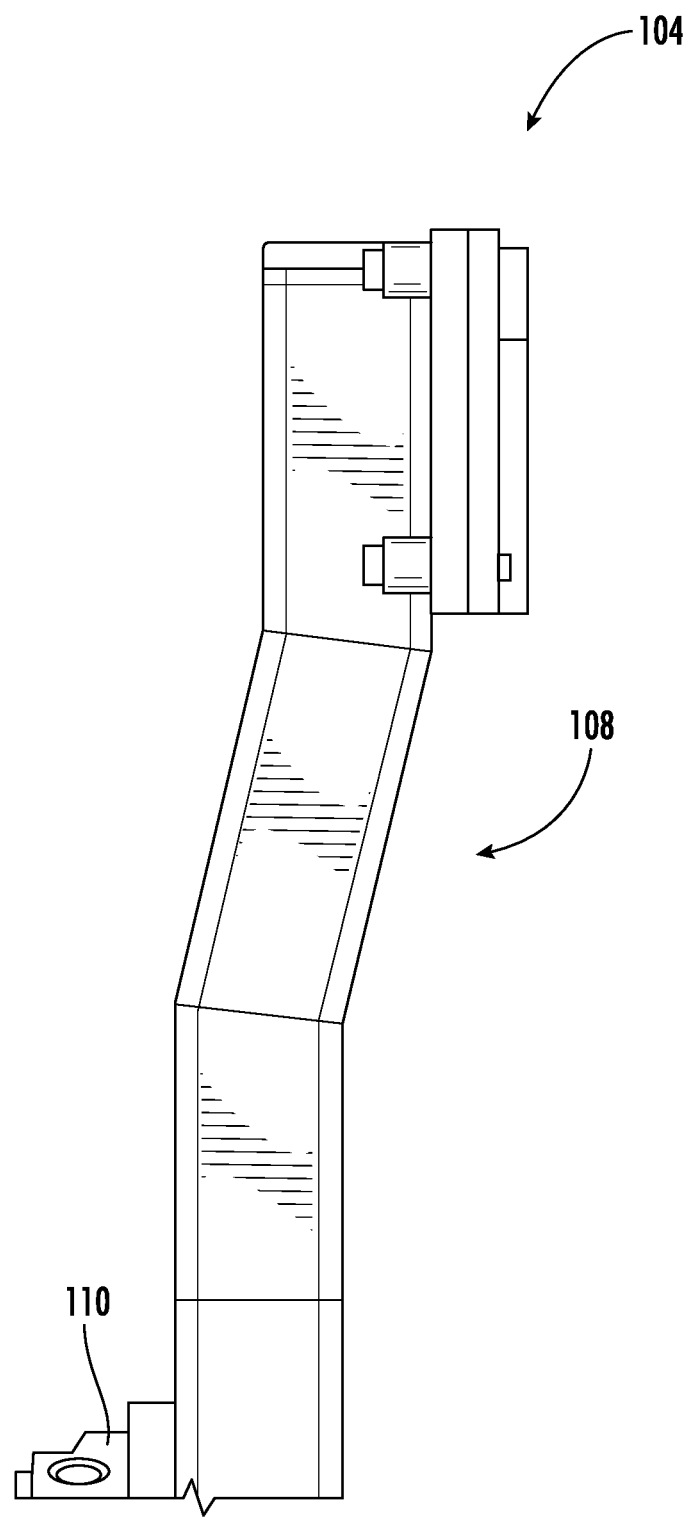
FIG. 11 illustrates a detailed view of an embodiment of a mounting portion of the mounting tool according to the present disclosure.

Moreover, as shown, the mounting tool 100 may also include an optional support component 128 having with a second receiving portion 130. More specifically, in an embodiment, as shown in FIG. 9, the first receiving portion 106 may have a first cavity 114 with a tapered inner surface 134. By having a tapered inner surface, the first cavity 114 is capable of accommodating portions of a wind turbine 10 with a variety of thicknesses which will allow the mounting tool 100 to be used on a variety of the wind turbine 10. Similarly, as shown in FIG. 10, the second receiving portion 130 may have a second cavity 132 for receiving another portion of the wind turbine 10. In addition, like the first cavity 114, the second cavity 132 of the second receiving portion 130 may have a tapered inner surface 142. Like the tapered inner surface 134 of the first cavity 114, the tapered inner surface 142 of the second cavity 132 may allow the mounting tool 100 to be placed on a wind turbine 10 portions with a variety of thicknesses. By allowing greater thicknesses, the mounting tool 100 may be capable of being used on a variety of wind turbines 10.

In addition, as shown, the first receiving portion 106 includes a first cavity 114 which may be externally secured to a portion of the wind turbine 10. Without intending to be limiting, in an embodiment, the portion of the wind turbine 10 may be a portion of a hub 20 of the wind turbine. In addition, the mounting tool 100 may also include an attachment means 118 adjustably secured to the base component 102 and the portion of the wind turbine 10 so as to secure the mounting tool 100 thereto. Thus, FIG. 9 illustrates a detailed view of the first receiving portion 106 of the mounting tool 100. In an embodiment, the mounting portion 104 of the mounting tool may be a detachable arm member 120 rotatably fixed to the first receiving portion 106 of the base component 102. Thus, as shown, the mounting surface 108 may be located on the detachable arm member 120. However, it should be understood that the mounting surface 108 may be placed anywhere on the mounting tool 100 that comports with general design principles and allows for an operator to operate the mounting tool 100 while making repairs with the repair tool 112.

In a further embodiment, the detachable arm member 120 may have a beam-like structure that extends outward from the base component 102. Further, the detachable arm member 120 may be rotatably adjustable to the base component 102, e.g., via a hinge point 122. Alternatively, the mounting surface 108 of the mounting portion 104 may not require detachable arm member 120. In such embodiments, for example, the mounting surface 108 may be a fixed point on the base component 102 instead. Further, the fixed point on the base component 102 may be located anywhere which allows the attachment and use of the repair tool 112 described herein.

In another embodiment, the mounting tool 100 may be used in a desired repair location which may be adjacent to a bearing. For example, in such embodiments, the bearing may be the pitch bearing 40 and/or the yaw bearing 44. Thus, in such embodiments, the repair tool 112 may be a torque tool for assembling or disassembling fasteners to or from such bearings. In further embodiments, the repair tool 112 may include any other suitable tool required when making repairs up-tower Referring particularly to FIGS. 4-8, various views of the attachment means 118 for securing the mounting tool 100 to the wind turbine 10 are provided. In particular, in an embodiment, the attachment means 118 may be one or more straps, one or more ropes, one or more bands, or any other suitable attachment means that allow the mounting tool 100 to be externally secured to the wind turbine 10 (e.g., without the use of fasteners or modifications thereto). In addition, as shown, the attachment means 118 may be wrapped around a portion of the wind turbine 10, such as one or more of the stiffening webs 78 of the hub 20. Thus, in a particular embodiment, the attachment means 118 may include two straps wrapped around one of the stiffening webs 78 of the hub 20 through one or more openings formed therein.

Referring now to FIGS. 4-7, in an embodiment, the first receiving portion 106 may further include one or more attachment braces 140 for providing greater mechanical forces by the attachment means 118 when the attachment means 118 secure the mounting tool 100 to the wind turbine 10. In an embodiment, for example, the attachment brace(s) 140 guide the attachment means 118 at a desired angle away from certain portions of the wind turbine 10. In further embodiments, the attachment means 118 may also be guided at a desired angle with different means beyond a brace 140. For example, the attachment means 118 may be guided by a first recessed pathway 136 within the base component 102 of the mounting tool to allow for greater securement of the attachment means 118. Further, the second receiving portion 130 may also have a second recessed pathway 138 to allow for even greater securement of the attachment means 118. In an alternative embodiment, the first recessed pathway may be only partially recessed to allow for the attachment means to be guided 118 away from the mounting tool 100 at a desired angle. More specifically, the recessed pathway 136 may have a non-recessed portion which allows for a desired angle to be achieved, then multiple recessed portions adjacent to the non-recessed portion which allow for greater securement of the mounting tool 100. In another alternative embodiment, the first receiving portion 106 may have any other suitable shape such as a gradual taper inward to allow for greater securement of the attachment means 118 to the base component 102 of the mounting tool 100.

In another embodiment, as shown in FIGS. 4-8, the attachment means 118 may be adjusted via at least one winching mechanism 126. For example, in an embodiment, the mounting tool 100 may include two winching mechanisms 126 corresponding to the two attachment means 118.

Figure 12:
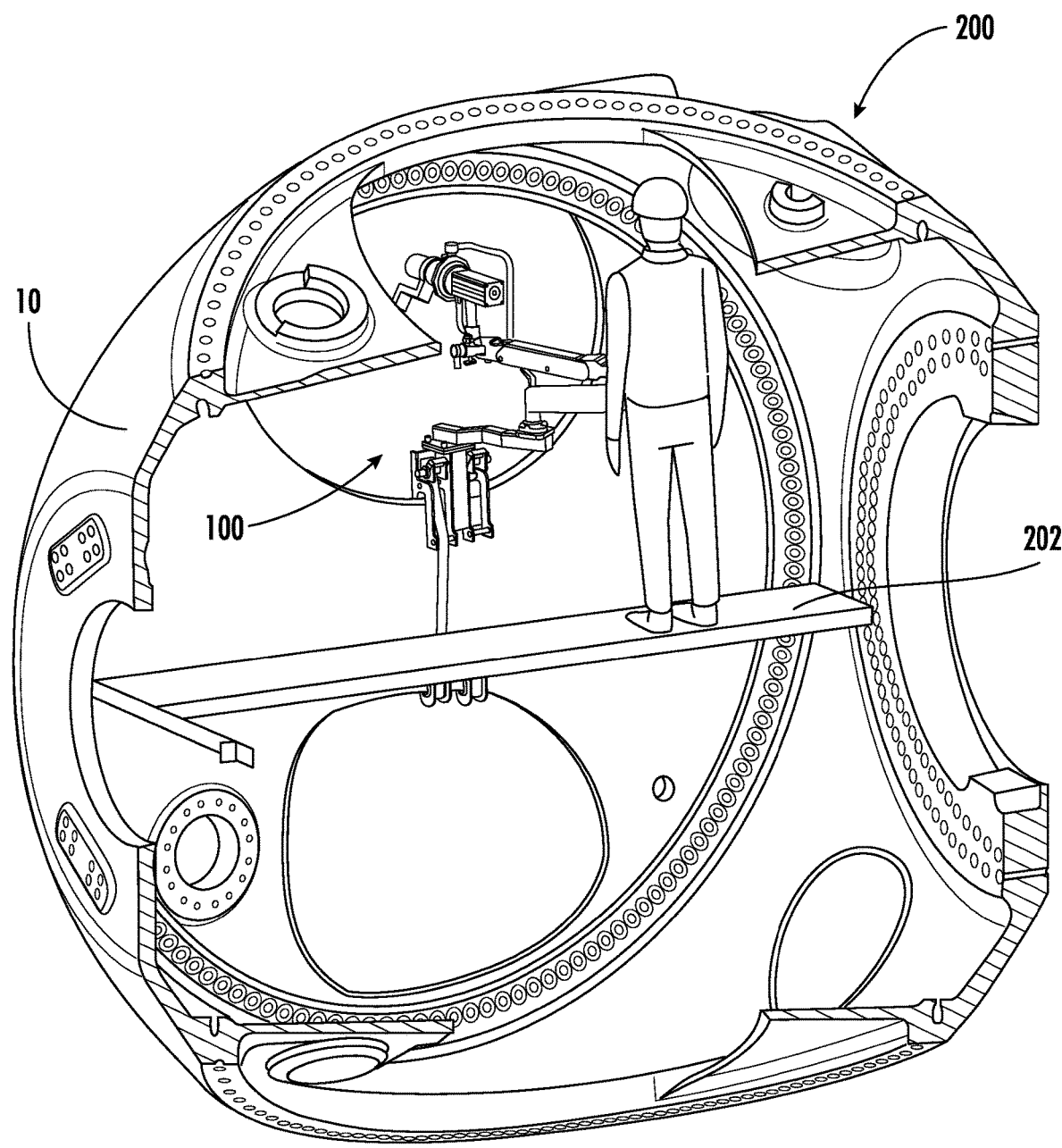
FIG. 12 illustrates a perspective view of a platform assembly mounted adjacent to a mounting tool at a desired repair location within a hub of the wind turbine according to the present disclosure.

Referring now to FIG. 12, a perspective view of an embodiment of a repair assembly 200 for a wind turbine 10 is shown. More specifically, as shown, the repair assembly 200 may include the repair tool 112 described herein, the mounting tool 100 described herein, and a platform assembly 202 for mounting adjacent to the mounting tool 100 at a desired repair location. More specifically, the mounting tool 100 of the repair assembly 200 may include a base component 102 with a mounting portion 104 which encompasses a mounting surface 108 and an attachment location 110 for a repair tool 112. The base component 102 may further include a first receiving portion 106 which encompasses a first cavity 114 which may be externally secured to a wind turbine 10. In addition, the mounting tool 100 may also include an attachment means 118 which may be adjustably secured to both the base component 102 and a portion of the wind turbine 10 so as to secure the mounting tool 100 to the wind turbine 10.

Figure 13:
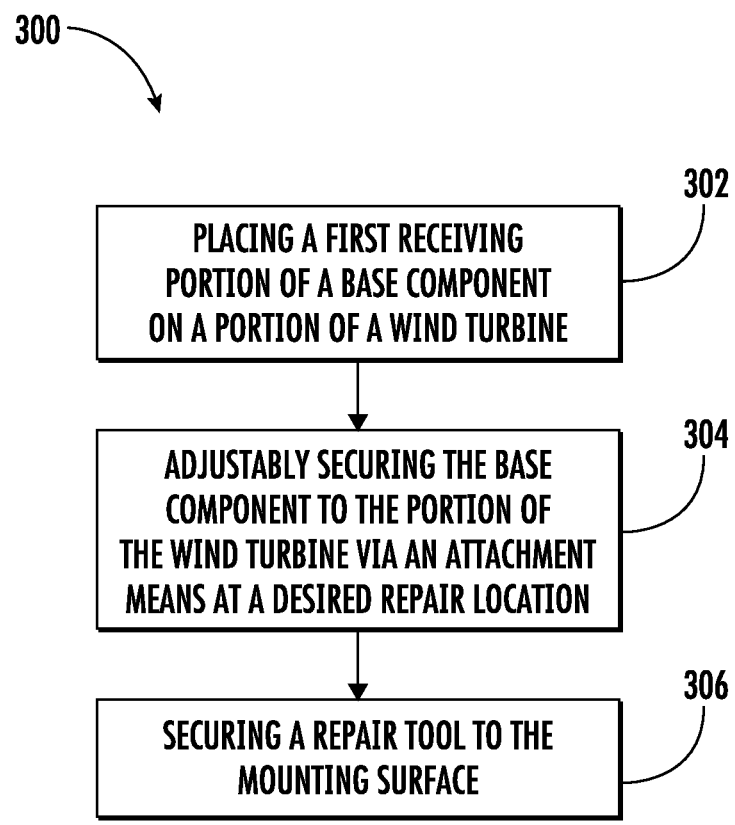
FIG. 13 illustrates a flow diagram of one embodiment of a method of using a mounting tool according to the present disclosure.

Referring now to FIG. 13, a flow diagram one embodiment of a method 300 of using a mounting tool according to the present disclosure. The method 300 may be implemented using, for instance, the mounting tool 100 of the present disclosure discussed above with references to FIGS. 1-9. FIG. 10 depicts steps performed in particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 includes placing a first receiving portion of a base component on a portion of a wind turbine. In such embodiments, as described herein, the base component further includes a mounting portion with a mounting surface defining an attachment location for receiving and securing a repair tool thereto. Further, the first receiving portion defines a first cavity for receiving the portion of the wind turbine so as to be externally secured to the wind turbine. Moreover, as shown at (304), the method 300 includes adjustably securing the base component to the portion of the wind turbine via an attachment means so as to secure the mounting tool to the wind turbine at a desired repair location. Thus, as shown at (306), the method 300 includes securing a repair tool to the mounting surface so as to maintain the repair tool at the desired repair location of the wind turbine.

Various aspects and embodiments of the present disclosure are defined by the following numbered clauses:

Clause 1. A mounting tool for use with one or more repair tools in a wind turbine, the mounting tool comprising:
- a base component comprising a mounting portion and a first receiving portion, the mounting portion comprising a mounting surface defining an attachment location for receiving and securing a repair tool thereto so as to maintain the repair tool at a desired repair location of the wind turbine, the first receiving portion defining a first cavity for receiving a portion of the wind turbine so as to be externally secured to the wind turbine; and
- attachment means adjustably secured to the first receiving portion of the base component and securable to the portion of the wind turbine so as to secure the mounting tool to the wind turbine at the desired repair location.

Clause 2. The mounting tool of clause 1, wherein the mounting portion is a detachable arm member rotatably affixed to the first receiving portion of the base component, the mounting surface and the attachment location being on the detachable arm member.

Clause 3. The mounting tool of any of the preceding clauses, wherein the desired repair location comprises a location adjacent to a bearing of the wind turbine, the bearing comprising at least one of a pitch bearing or a yaw bearing, and wherein the repair tool is a torque tool for assembling or disassembling fasteners to or from at least one of the pitch bearing or the yaw bearing.

Clause 4. The mounting tool of any of the preceding clauses, wherein the first cavity of the first receiving portion comprises a tapered inner surface for accommodating varying thicknesses of the portion of the wind turbine.

Clause 5. The mounting tool of any of the preceding clauses, wherein the attachment means comprise at least one of one or more straps, one or more ropes, or one or more bands.

Clause 6. The mounting tool of clause 5, wherein the attachment means comprises at least two straps that wrap around the portion of the wind turbine.

Clause 7. The mounting tool of any of the preceding clauses, wherein the portion of the wind turbine is a web of a hub of the wind turbine.

Clause 8. The mounting tool of clauses 5-6, further comprising at least one winching mechanism for adjusting the attachment means.

Clause 9. The mounting tool of any of the preceding clauses, further comprising a support component comprising a second receiving portion defining a second cavity for receiving a different portion of the wind turbine.

Clause 10. The mounting tool of clause 9, wherein the second cavity of the second receiving portion comprises a tapered inner surface for accommodating varying thicknesses of the different portion of the wind turbine.

Clause 11. The mounting tool of clauses 9-10, wherein the base component and the support component each comprises one or more corresponding recessed pathways for receiving and securing the attachment means therein.

Clause 12. The mounting tool of clause 11, wherein at least one of the one or more corresponding recessed pathways guides the attachment means at a desired angle away from the portion of the wind turbine.

Clause 13. A repair assembly for a wind turbine, comprising:
- a repair tool;
- a mounting tool comprising a base component and attachment means for securing the base component to a portion of the wind turbine, the mounting tool comprising a mounting portion and a first receiving portion, the mounting portion comprising a mounting surface defining an attachment location for receiving and securing the repair tool thereto so as to maintain the repair tool at a desired repair location of the wind turbine, the first receiving portion defining a first cavity for receiving a portion of the wind turbine so as to be externally secured to the wind turbine, the attachment means adjustably secured to the first receiving portion of the base component and securable to the portion of the wind turbine so as to secure the mounting tool to the wind turbine at the desired repair location; and
- a platform assembly for mounting adjacent to the mounting tool at the desired repair location.

Clause 14. A method of using a mounting tool, the method comprising:
- placing a first receiving portion of a base component of the mounting tool on a portion of a wind turbine, the base component further comprising a mounting portion comprising a mounting surface defining an attachment location for receiving and securing a repair tool thereto, the first receiving portion defining a first cavity for receiving the portion of the wind turbine so as to be externally secured to the wind turbine;
- adjustably securing the base component to the portion of the wind turbine via an attachment means so as to secure the mounting tool to the wind turbine at a desired repair location; and
- securing a repair tool to the mounting surface so as to maintain the repair tool at the desired repair location of the wind turbine.

Clause 15. The method of clause 14, wherein the desired repair location comprises a location adjacent to a bearing of the wind turbine, the bearing comprising at least one of a pitch bearing or a yaw bearing, and wherein the repair tool is a torque tool for assembling or disassembling fasteners to or from at least one of the pitch bearing or the yaw bearing.

Clause 16. The method of clauses 14-15, wherein the first cavity of the first receiving portion comprises a tapered inner surface for accommodating varying thicknesses of the portion of the wind turbine.

Clause 17. The method of clauses 14-16, wherein the attachment means comprise at least one of one or more straps, one or more ropes, or one or more bands.

Clause 18. The method of clauses 14-17, further comprising at least one winching mechanism for adjusting the attachment means.

Clause 19. The method of clauses 14-18, further comprising placing a support component on a different portion of the wind turbine, wherein the support component comprises a second receiving portion defining a second cavity for receiving the second portion of the wind turbine.

Clause 20. The method of clauses 14-19, wherein the base component and the support component each comprises one or more corresponding recessed pathways for receiving and securing the attachment means therein.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mounting tool for use with one or more repair tools in a wind turbine, the mounting tool comprising:
    a base component comprising a mounting portion and a first receiving portion, the mounting portion comprising a mounting surface defining an attachment location for receiving and securing a repair tool thereto so as to maintain the repair tool at a desired repair location of the wind turbine, the first receiving portion defining a first cavity for receiving a portion of the wind turbine so as to be externally secured to the wind turbine;
    a support component comprising a second receiving portion defining a second cavity for receiving a different portion of the wind turbine, wherein the support component is physically detached from the base component; and
    attachment means adjustably secured over the first receiving portion of the base component and over the second receiving portion of the support component such that the base component and support component are configured to be secured to the wind turbine at the desired repair location.

2. The mounting tool of claim 1, wherein the mounting portion is a detachable arm member rotatably affixed to the first receiving portion of the base component, the mounting surface and the attachment location being on the detachable arm member.

3. The mounting tool of claim 1, wherein the desired repair location comprises a location adjacent to a bearing of the wind turbine, the bearing comprising at least one of a pitch bearing or a yaw bearing, and wherein the repair tool is a torque tool for assembling or disassembling fasteners to or from at least one of the pitch bearing or the yaw bearing.

4. The mounting tool of claim 1, wherein the first cavity of the first receiving portion comprises a tapered inner surface for accommodating varying thicknesses of the portion of the wind turbine.

5. The mounting tool of claim 1, wherein the attachment means comprise at least one of one or more straps, one or more ropes, or one or more bands.

6. The mounting tool of claim 5, wherein the attachment means comprises at least two straps that wrap around the portion of the wind turbine.

7. The mounting tool of claim 1, wherein the portion of the wind turbine is a web of a hub of the wind turbine.

8. The mounting tool of claim 5, further comprising at least one winching mechanism for adjusting the attachment means.

9. The mounting tool of claim 1, wherein the second cavity of the second receiving portion comprises a tapered inner surface for accommodating varying thicknesses of the different portion of the wind turbine.

10. The mounting tool of claim 1, wherein the base component and the support component each comprises one or more corresponding recessed pathways for receiving and securing the attachment means therein.

11. The mounting tool of claim 10, wherein at least one of the one or more corresponding recessed pathways guides the attachment means at a desired angle away from the portion of the wind turbine.

12. A repair assembly for a wind turbine, comprising:
    a repair tool;
    a mounting tool comprising a base component and attachment means for securing the base component to a portion of the wind turbine, the mounting tool comprising a mounting portion and a first receiving portion, the mounting portion comprising a mounting surface defining an attachment location for receiving and securing the repair tool thereto so as to maintain the repair tool at a desired repair location of the wind turbine, the first receiving portion defining a first cavity for receiving a portion of the wind turbine so as to be externally secured to the wind turbine;
    a support component comprising a second receiving portion defining a second cavity for receiving a different portion of the wind turbine, wherein the support component is physically detached from the base component, wherein the attachment means is adjustably secured over the first receiving portion of the base component and over the second receiving portion of the support component such that the base component and support component are configured to be secured to the wind turbine at the desired repair location; and
    a platform assembly for mounting adjacent to the mounting tool at the desired repair location.

13. A method of using a mounting tool, the method comprising:
    placing a first receiving portion of a base component of the mounting tool on a portion of a wind turbine, the base component further comprising a mounting portion comprising a mounting surface defining an attachment location for receiving and securing a repair tool thereto, the first receiving portion defining a first cavity for receiving the portion of the wind turbine so as to be externally secured to the wind turbine;
    placing a support component comprising a second receiving portion defining a second cavity for receiving a different portion of the wind turbine on a different portion of the wind turbine, wherein the support component is physically detached from the base component;

adjustably securing the base component and the support component to the portion of the wind turbine via an attachment means so as to secure the mounting tool to the wind turbine at a desired repair location, wherein the attachment means is placed over the first receiving portion of the base component and the second receiving portion of the support component such that the base component and support component are secured to the wind turbine at the desired repair location; and securing a repair tool to the mounting surface so as to maintain the repair tool at the desired repair location of the wind turbine.

14. The method of claim 13, wherein the desired repair location comprises a location adjacent to a bearing of the wind turbine, the bearing comprising at least one of a pitch bearing or a yaw bearing, and wherein the repair tool is a torque tool for assembling or disassembling fasteners to or from at least one of the pitch bearing or the yaw bearing.

15. The method of claim 13, wherein the first cavity of the first receiving portion comprises a tapered inner surface for accommodating varying thicknesses of the portion of the wind turbine.

16. The method of claim 13, wherein the attachment means comprise at least one of one or more straps, one or more ropes, or one or more bands.

17. The method of claim 13, further comprising at least one winching mechanism for adjusting the attachment means.

18. The method of claim 13, wherein the base component and the support component each comprises one or more corresponding recessed pathways for receiving and securing the attachment means therein.

* * * * *